March 25, 1941.  J. F. MAHLSTEDT  2,236,295

PIPE LOCATING AND PROTECTING MEANS

Filed July 1, 1938

INVENTOR.
J. F. MAHLSTEDT.
BY
ATTORNEY

Patented Mar. 25, 1941

2,236,295

UNITED STATES PATENT OFFICE 2,236,295

PIPE LOCATING AND PROTECTING MEANS

John Frederick Mahlstedt, Los Angeles, Calif.

Application July 1, 1938, Serial No. 217,101

2 Claims. (Cl. 137—111)

My present invention relates to a pipe locating and protecting means, and more particularly adapted for locating fittings or outlets of pipes concealed in the earth adjacent the surface.

One of the objects of this invention is to provide a means, system, or arrangement of this class whereby means may be readily and easily applied to a pipe which is to be concealed in the ground, to facilitate, from the surface of the ground, the location of a fitting, outlet, or the like, and for protecting the pipe adjacent the fitting or outlet when unearthing the section of the pipe containing the fitting or outlet.

Another object is to provide a very simple and economical means for effecting this result.

A further object of this invention is to provide a novel and simple wood block or board for such purpose, whereby the pipe and fitting are more effectively protected and whereby the pipe and fitting may be more easily and quickly located.

Figure 1:
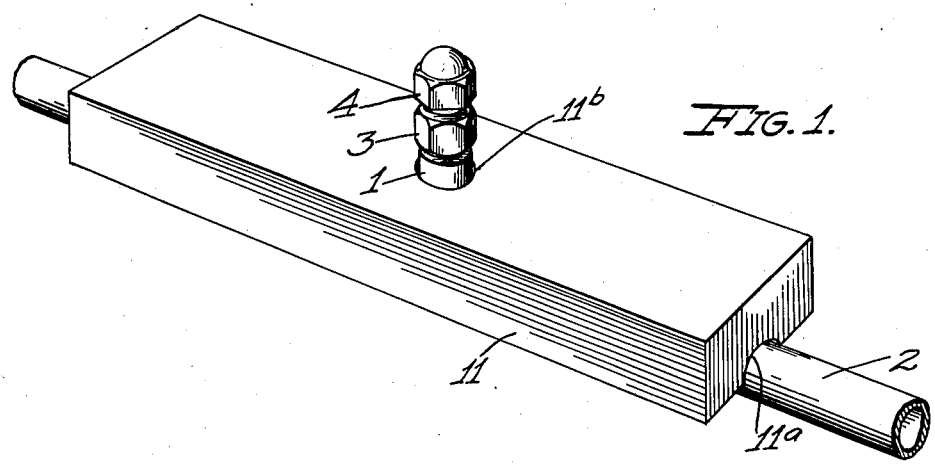
Figure 2:
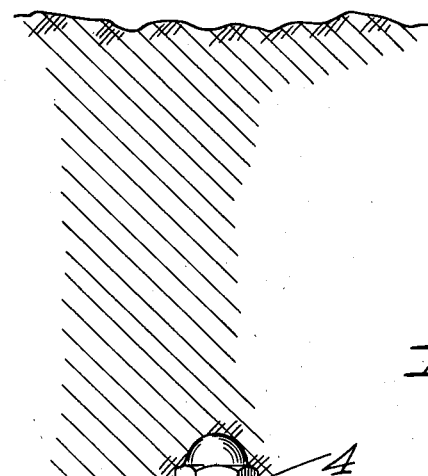

With these and other objects in view as will appear hereinafter, I have devised a novel means or system for bringing about the stated results, as will be hereinafter described in detail and particularly set forth in the appended claims, reference being had to the accompanying drawing and to the characters of reference thereon, which form a part of this application, in which:

Fig. 1 is a perspective view of a pipe section showing my pipe locating and protecting means, in one form, around one of the outlets in the pipe; and, Fig. 2 is an enlarged elevational view thereof, showing more specifically the relation of such means to the pipe and the surface of the ground in which the pipe is buried.

In underground pipe line systems, and more particularly in underground orchard heating pipe line systems, the heaters, or other fixtures, are periodically or seasonally disconnected from outlets immediately adjacent the main pipes of the pipe line, and these outlets or other fittings are covered up by earth to a depth of twelve inches (12") or eighteen inches (18"). When again desiring to connect the heaters or other fixtures to the outlets or fittings, the latter must be located, primarily through guess work or through digging into the ground at random. The pipes or conduits comprising the pipe line system for orchard heating, consists usually of copper or other readily bendable metal tubing or a tar coated iron pipe. If a shovel is used to dig at random into the ground to locate and uncover the outlet or fitting, the tubing is often cut or mutilated, or the coating scraped from the other pipe, subjecting the same to a rapid deterioration process.

When the heaters in orchard heating pipe line systems are disconnected, there remains only a bare riser 1 at intervals in the pipe line 2 near which heaters are to be located. At the upper ends of the risers are often provided outlet fittings 3 and caps 4 for the upper ends of outlet fittings. The pipe line 2, when made of ordinary iron pipes is coated with a tar coating 5.

When the pipe is laid, or when the outlet is uncovered, I place a wood block or board 11 around the outlet and over the portion of the pipe adjacent the outlet. This block or board may be about eighteen inches (18") long, two and one-half (2½) to three inches (3") wide, and about one inch (1") thick, and is preferably made from wood which does not readily deteriorate, and is further saturated in a protective solution, such as creosote. The block or board has a longitudinal groove 11$^a$ at its underside and a transverse hole 11$^b$ intermediate its ends, the hole 11$^b$ receiving the upright or riser of the pipe line, while the groove 11$^a$ locates the block or board on the pipe. The riser and outlet fittings extend preferably above the block.

In order to locate the outlet fitting, a small rod is forced into the ground at intervals until the board 11 is located. A shovel is then used for uncovering a portion of the board. The shovel is then forced along the top of the board until the riser or fitting is encountered.

Though I have shown and described a particular construction and arrangement of parts, I do not wish to be limited to the same, but desire to include in the scope of my invention the construction and arrangement substantially as set forth in the appended claims.

I claim:

1. In a means of the class described, the combination with a round underground pipe having an underground upwardly projecting outlet, of a wooden board having a transverse hole intermediate its ends and a longitudinal groove at its underside, said board being laid horizontally and loosely over said pipe with said outlet projecting through said hole and said pipe fitting in said groove.

2. In a means of the class described, the combination with an underground pipe having an underground upwardly projecting outlet, of a shield having a hole intermediate its ends and a longitudinal groove at its underside outwardly from said hole, said shield being loosely positioned over said pipe with said outlet projecting through said hole and said pipe fitting in said longitudinal groove.

JOHN FREDERICK MAHLSTEDT.